United States Patent [19]

Schmid et al.

[11] Patent Number: 5,707,956
[45] Date of Patent: Jan. 13, 1998

[54] NONIONIC DETERGENT MIXTURES BASED ON SPECIFIC MIXED ETHERS

[75] Inventors: Karl Schmid, Mettmann; Manfred Weuthen, Solingen; Karin Koren, Duesseldorf; Detlev Stanislowski, Ratingen, all of Germany

[73] Assignee: Henkel Kommanditgesellschaft auf Aktien, Duesseldorf, Germany

[21] Appl. No.: 663,036

[22] PCT Filed: Dec. 1, 1994

[86] PCT No.: PCT/EP94/04001

§ 371 Date: Jun. 10, 1996

§ 102(e) Date: Jun. 10, 1996

[87] PCT Pub. No.: WO95/16015

PCT Pub. Date: Jun. 15, 1995

[30] Foreign Application Priority Data

Dec. 10, 1993 [DE] Germany .................. 43 42 214.4

[51] Int. Cl.⁶ .................. C11D 1/722; C11D 1/72; C11D 1/825
[52] U.S. Cl. .................. 510/422; 510/219; 510/413; 510/506; 510/514; 510/535
[58] Field of Search .................. 510/219, 422, 510/421, 413, 506, 514, 535; 252/243, 242

[56] References Cited

U.S. PATENT DOCUMENTS

| | | | |
|---|---|---|---|
| 4,548,729 | 10/1985 | Schmid et al. | 252/174.21 |
| 4,624,803 | 11/1986 | Balzer et al. | 252/527 |
| 4,753,885 | 6/1988 | Dietsche et al. | 435/243 |
| 4,780,237 | 10/1988 | Schmid et al. | 510/422 |
| 4,853,145 | 8/1989 | Schmid et al. | 510/421 |
| 4,942,049 | 7/1990 | Schmid et al. | 426/329 |
| 4,965,019 | 10/1990 | Schmid et al. | 510/406 |
| 4,973,423 | 11/1990 | Geke et al. | 252/174.21 |
| 5,205,959 | 4/1993 | Schmid et al. | 510/422 |
| 5,308,401 | 5/1994 | Geke et al. | 134/2 |
| 5,484,553 | 1/1996 | Guth et al. | 252/351 |

FOREIGN PATENT DOCUMENTS

| | | |
|---|---|---|
| 124 815 | 11/1984 | European Pat. Off. . |
| 0161 537 | 11/1985 | European Pat. Off. . |
| 180 081 | 5/1986 | European Pat. Off. . |
| 019 74 34 | 10/1986 | European Pat. Off. . |
| 303 928 | 2/1989 | European Pat. Off. . |
| 324 340 | 7/1989 | European Pat. Off. . |
| 420 802 | 4/1991 | European Pat. Off. . |
| 2800 710 | 7/1979 | Germany . |
| 37 44 525 | 12/1988 | Germany . |
| 39 28 600 | 3/1991 | Germany . |
| 42 43 643 | 8/1993 | Germany . |

OTHER PUBLICATIONS

Fat Sci. Technol. 89, 106 (1987).
Tens. Surf. Det. 27, 243 (1990).
Fette, Seifen, Anmtstrichmitt., 87, 421 (1985).

*Primary Examiner*—Ardith Hertzog
*Attorney, Agent, or Firm*—Ernest G. Szoke; Wayne C. Jaeschke; Real J. Grandmaison

[57] ABSTRACT

A nonionic detergent mixture containing a) an ether corresponding to formula (I):

$$R^1O(CH_2CH_2O)_mR^2 \qquad (I)$$

in which $R^1$ is an aliphatic linear alkyl or alkenyl radical containing 12 to 18 carbon atoms, $R^2$ is an alkyl radical containing 1 to 4 carbon atoms or a benzyl radical and m is a number of 5 to 15, and b1) an ether selected from the group consisting of an ether corresponding to formula (II):

$$R^3O(CH_2CHO)_p(CH_2CH_2O)_qR^4 \qquad (II)$$
$$\underset{|}{CH_3}$$

in which $R^3$ is an aliphatic, linear or branched alkyl radical containing 8 to 10 carbon atoms, $R^4$ is an alkyl radical containing 1 to 4 carbon atoms or a benzyl radical, p is a number of 2 to 3 and q is a number of 8 to 15 and b2) an ether corresponding to formula (III):

$$R^5O(CH_2CHO)_x(CH_2CH_2O)_yR^6 \qquad (III)$$
$$\underset{|}{CH_3}$$

in which $R^5$ is an aliphatic, linear alkyl radical containing 12 to 14 carbon atoms, $R^6$ is an alkyl radical containing 1 to 4 carbon atoms or a benzyl radical, x is a number of 0.5 to 2 and y is a number of 5 to 10.

7 Claims, No Drawings

NONIONIC DETERGENT MIXTURES BASED ON SPECIFIC MIXED ETHERS

BACKGROUND OF THE INVENTION

1. Field of the Invention

This invention relates to nonionic detergent mixtures based on selected mixed ether types and to their use for the production of surface-active formulations.

2. Discussion of Related Art

The presence of foam is extremely undesirable in a number of industrial processes. For example, both in the machine washing of beer bottles or milk bottles and in the spray cleaning of automobile panels, it is not only the cleaning or degreasing effect of the surface-active formulations used which is crucial, the avoidance of form which can severely impair the operation of equipment is equally important. This is all the more so insofar as highly active but also high-foaming anionic surfactants are used in many cases.

The problem of foam regulation has certainly been known for some time with the result that several more or less convincing solutions are known from the prior art. These known solutions may be divided into two groups:

The first group comprises processes involving the addition of defoamers which are often paraffinic hydrocarbons or silicone compounds. In most cases, however, this is undesirable for the described applications. The second group of processes involves the use of surface-active formulations which are themselves low-foaming and which, optionally, many also exhibit defoaming properties. The surface-active formulations in question are generally nonionic surfactants or surfactant-like systems such as, for example, fatty alcohol propylene glycol ethers or block polymers of ethylene and propylene glycol which, unfortunately, are not sufficiently biodegradable.

End-capped fatty alcohol polyglycol ethers, so-called "mixed ethers", which are described for example by R. Piorr in Fat. Sci. Technol. 89, 106 (1987), have established themselves on the market as particularly effective low-foaming surfactants.

The use of mixed ethers as low-foaming surfactants has also been extensively described in the patent literature. For example, EP-A 0 124 815 (Henkel) describes mixed ethers containing 8 to 18 carbon atoms in the fatty alkyl chain and 7 to 12 ethylene oxide units in the polyether chain as foam-suppressing additives for low-foaming cleaning formulations. Octyl and/or decyl mixed ethers containing 3 to 4 ethylene oxide units are proposed for the same purpose in EP-B 0 303 928 (Henkel).

According to EP-A 0 180 081 (BASF), mixed ethers containing 6 to 12 carbon atoms in the fatty alkyl chain and EO/PO/EO blocks in the polyether chain may be used for suppressing foam in the processing of foods and in fermentation processes. According to the teaching of EP-B 0 324 340 (Henkel), mixed ethers containing 6 to 28 carbon atoms in the fatty alkyl chain and 2 to 10 ethylene oxide units in the polyether chain may be used for the same purpose. In addition, DE-A 39 28 600 (Henkel) describes nonionic surfactant mixtures containing non-end-capped fatty alcohol polyalkylene glycol ethers in addition to various types of mixed ethers.

EP-A 0 420 802 (Ciba-Geigy) describes wetting agents containing open-chain and/or end-capped fatty alcohol polyglycol ethers for the pretreatment of textiles. Starting materials containing a fatty alkyl chain of at least 8 and preferably 9 to 14 carbon atoms and 2 to 24 and preferably 4 to 8 alkylene oxide units in the polyether chain are disclosed as suitable; they may have open chains or may be end-capped by a $C_{1-8}$ alkyl group, a cycloaliphatic radical containing at least 5 carbon atoms or a phenyl lower alkyl or styryl group. The only Example refers solely to the use of an open-chain adduct of 15 moles of alkylene oxide with a $C_{9-11}$ oxoalcohol.

Finally, mixed ethers based on linear fatty alcohol PO EO adducts which contain 8 to 10 carbon atoms in the fatty alkyl chain, 0.5 to 2 moles of propylene oxide and 7 to 9 moles of ethylene oxide in the molecule and which are end-capped by a $C_{1-4}$ alkyl radical are known from DE-C1 42 43 634 (Henkel).

A particular problem involved in the optimization of mixed ethers is to balance the need for products with excellent performance properties on the one hand and high ecotoxicological compatibility on the other hand. In specific terms, a particular problem addressed by the present invention was to mix mixed ethers in such a way that the mixtures would not only show favorable cleaning and foaming properties, they would also be readily biodegradable and would show low toxicity towards aquatic biocoenoses ($LC_{50}>1$ mg/l).

DESCRIPTION OF THE INVENTION

The present invention relates to nonionic detergent mixtures containing a) mixed ethers corresponding to formula (I):

$$R^1O(CH_2CH_2O)_mR^2 \qquad (I)$$

in which $R^1$ is an aliphatic linear alkyl and/or alkenyl radical containing 12 to 18 carbon atoms, $R^2$ is an alkyl radical containing 1 to 4 carbon atoms or a benzyl radical and m is a number of 5 to 15, and b1) mixed ethers corresponding to formula (II):

$$R^3O(CH_2CHO)_p(CH_2CH_2O)_qR^4 \qquad (II)$$
with CH$_3$ on the CHO carbon in which $R^3$ is an aliphatic, linear or branched alkyl radical containing 8 to 10 carbon atoms, $R^4$ is an alkyl radical containing 1 to 4 carbon atoms or a benzyl radical, p is a number of 2 to 3 and q is a number of 8 to 15, and b2) mixed ethers corresponding to formula (III):

$$R^5O(CH_2CHO)_x(CH_2CH_2O)_yR^6 \qquad (III)$$
with CH$_3$ on the CHO carbon in which $R^5$ is an aliphatic, linear alkyl radical containing 12 to 14 carbon atoms, $R^6$ is an alkyl radical containing 1 to 4 carbon atoms or a benzyl radical, x is a number of 0.5 to 2 and y is a number of 5 to 10.

It has surprisingly been found the surfactant mixtures according to the invention not only show excellent performance properties, they also exceed a value of 60% in their ultimate biological degradation and have a toxicity towards aquatic biocoenoses ($LC_{50}$ value) above 1 mg/l. Accordingly, the surfactant mixtures may be classified as readily biodegradable and as showing low aquatic toxicity.

Mixed Ethers

Mixed ethers are known substances which may be obtained by the relevant methods of preparative organic chemistry. They are normally prepared by WILLIAMSON's ether synthesis in which fatty alcohol polyglycol ethers are condensed with alkyl halides in the presence of strong bases. Processes for their production are known, for example, from DE-OS 28 00 710 (Kuraray) and DE-C1 37 44 525 (Henkel). In addition, an overview by Piorr et al. on the subject of "mixed ethers" can be found in Fat Sci. Technol. 89, 106 (1987).

Typical examples of mixed ethers which may be used as component a) of the mixtures according to the invention are methyl-, ethyl- or butyl-end-capped adducts of 5 to 15 moles and preferably 8 to 12 moles of ethylene oxide with linear cocofatty alcohols containing 12 to 18 and preferably 12 to 14 carbon atoms. A $C_{12/18}$ cocofatty alcohol 10 EO n-butyl ether (Dehypon® LT104, Henkel KGaA, Düsseldorf, FRG) is particularly preferred.

Component b1) may be selected, for example, from methyl-, ethyl- or butyl-end-capped adducts of, on average, first 2 to 3 moles of propylene oxide and then 8 to 15 moles of ethylene oxide with primary alcohols containing 8 to 10 carbon atoms. $C_{8/10}$ 1.3 PO 9 EO n-butyl ether, 2-ethylhexyl 1.5 PO 10 EO n-butyl ether or isodecyl 1.3 PO 8 EO tert.butyl ether, for example, is particularly preferred.

Component b2) may be selected, for example, from methyl-, ethyl- or butyl-end-capped adducts of, on average, first 0.5 to 2 moles of propylene oxide and then 5 to 10 moles of ethylene oxide with fatty alcohols containing 12 to 14 carbon atoms. A typical example is $C_{12/14}$ 1.3 PO 9 EO n-butyl ether.

The nonionic detergent mixtures according to the invention may contain components a) and b) in a ratio by weight of 25:75 to 75:25 and preferably in a ratio by weight of 40:60 to 60:40. The ratio of component b1) to component b2) may be from 0:100 to 100:0 and is preferably from 25:75 to 75:25.

Other Nonionic Ingredients

In addition to the above-mentioned mixed ethers corresponding to formulae (I) to (III), the nonionic detergent mixtures according to the invention may contain other mixed ethers corresponding to formula (IV):

$$R^7O(CH_2CH_2O)_nR^8 \quad \text{(IV)}$$

in which $R^7$ is an aliphatic branched alkyl radical containing 8 to 18 carbon atoms, $R^8$ is an alkyl radical containing 1 to 4 carbon atoms or a benzyl radical and n is a number of 5 to 15. Examples of these other mixed ethers are methyl-, ethyl- or butyl-end-capped adducts of, on average, 5 to 15 moles of ethylene oxide with oxoalcohols containing 8 to 18 carbon atoms. A typical example is isotridecyl 10 EO n-butyl ether. The percentage content of mixed ethers corresponding to formula (IV) may be from 10 to 40% by weight, based on the mixture.

In addition, the detergent mixtures according to the invention may contain fatty alcohol polyglycol ethers corresponding to formula (V):

$$R^9O(CH_2CH_2O)_zH \quad \text{(V)}$$

in which $R^9$ is an alkyl radical containing 12 to 14 carbon atoms and z is a number of 2 to 4. Typical examples are adducts of, on average, 2 to 4 moles of ethylene oxide with fatty alcohols containing 12 to 14 carbon atoms, such as for example $C_{12/14}$ cocoalkyl 3 EO adduct. The polyglycol ethers may have a conventional homolog distribution although they preferably have a narrow homolog distribution. The percentage content of fatty alcohol polyglycol ethers corresponding to formula (V) may be from 10 to 40% by weight, based on the mixture.

Commercial Applications

The nonionic detergent mixtures according to the invention are distinguished by excellent performance properties, are readily biodegradable and show low aquatic toxicity.

Accordingly, the present invention also relates to the use of the nonionic detergent mixtures according to the invention for the production of surface-active formulations, more especially rinse aids, cleaning formulations for hard surfaces and defoamers for detergents.

The following Examples are intended to illustrate the invention without limiting it in any way.

Examples

I. Wetting Power

Wetting power was determined by the immersion wetting method using 1 g of active substance/l, 20° C., in water with a hardness of 16° d. Particulars of this method can be found in Tens. Surf. Det. 27, 243 (1990). The wetting time $t_n$ was determined in s. The results are set out in Table 1.

II. Foaming Power

Foaming power was determined by the foam generation method using 1 g of active substance/l, 20° C., in water with a hardness of 16° d. Particulars of this method can be found in Tens. Surf. Det. 27, 243 (1990). The basic foam (t-0) and the foam collapse after 5 minutes in ml were determined. The results are set out in Table 1.

III. Ultimate Biological Degradation

Biological degradability was determined by the Closed Bottle Test. The degradation rate (BOD/COD) after 30 days was determined. Particulars of this test can be found in Fette, Seifen, Antstrichmitt., 87, 421 (1985). The results are set out in Table 2.

IV. Aquatic Toxicity

Aquatic toxicity was determined against fish (carp), daphniae and algae. It is expressed as the $LC_{50}$ value, i.e. the lethal concentration for 50% of the population. The results are set out in Table 3.

TABLE 1

| | | Wetting and foaming power | | | | | |
|---|---|---|---|---|---|---|---|
| Ex. | PC % | R | PO | EO | EC | $t_n$ s | $S^0$ |
| 1 | 50 | n-16/18 | — | 10 | 4 | 20 | 0 |
| | 50 | i-13 | — | 10 | 4 | | |
| 2 | 50 | n-12/18 | — | 10 | 4 | 20 | 0 |
| | 50 | i-13 | — | 10 | 4 | | |
| 3 | 40 | n-12/18 | — | 10 | 4 | 22 | 0 |
| | 60 | n-8/10 | 2 | 10 | 4 | | |
| 4 | 40 | n-12/18 | — | 10 | 4 | 21 | 0 |
| | 30 | i-13 | — | 10 | 4 | | |
| | 30 | n-12/14 | 1 | 10 | 4 | | |

TABLE 1-continued

Wetting and foaming power

| Ex. | PC % | R | PO | EO | EC | $t_n$ s | $S^0$ |
|---|---|---|---|---|---|---|---|
| C1 | 100 | n-12 | — | 8 | 4 | 28 | 0 |
| C2 | 100 | i-13 | — | 10 | 4 | 21 | 0 |

Legend:
PC = percentage content in the detergent mixture
R = alcohol radical
PO = propylene oxide groups
EO = ethylene oxide groups
EC = end capping
$t_n$ = wetting time
$S^0$ = basic foam

TABLE 2

Biological degradability
Percentages as % by weight

| Ex. | PC % | R | PO | EO | EC | CB Test BOD/CO |
|---|---|---|---|---|---|---|
| 5 | 50 | n-16/18 | — | 10 | 4 | >60 |
|   | 50 | i-13 | — | 10 | 4 |  |
| 6 | 50 | n-12/18 | — | 10 | 4 | >60 |
|   | 50 | i-13 | — | 10 | 4 |  |
| 7 | 40 | n-12/18 | — | 10 | 4 | >60 |
|   | 60 | n-8/10 | 2 | 10 | 4 |  |
| 8 | 40 | n-12/18 | — | 10 | 4 | >60 |
|   | 30 | i-13 | — | 10 | 4 |  |
|   | 30 | n-12/14 | 1 | 10 | 4 |  |
| C3 | 100 | n-12 | — | 8 | 4 | >60 |
| C4 | 100 | i-13 | — | 10 | 4 | <60 |

TABLE 3

Toxicity towards aquatic organisms

| Ex. | PC % | R | PO | EO | EC | F. $LC_{50}$ mg/l | D. $LC_{50}$ mg/l | A. $LC_{50}$ mg/l |
|---|---|---|---|---|---|---|---|---|
| 9 | 50 | n-16/18 | — | 10 | 4 | >1 | >1 | >1 |
|   | 50 | i-13 | — | 10 | 4 |  |  |  |
| 10 | 50 | n-12/18 | — | 10 | 4 | >1 | >1 | >1 |
|   | 50 | i-13 | — | 10 | 4 |  |  |  |
| 11 | 40 | n-12/18 | — | 10 | 4 | >1 | >1 | >1 |
|   | 60 | n-8/10 | 2 | 10 | 4 |  |  |  |
| 12 | 40 | n-12/18 | — | 10 | 4 | >1 | >1 | >1 |
|   | 30 | i-13 | — | 10 | 4 |  |  |  |
|   | 30 | n-12/14 | 1 | 10 | 4 |  |  |  |
| C5 | 100 | n-12 | — | 8 | 4 | <1 | <1 | <1 |
| C6 | 100 | i-13 | — | 10 | 4 | >1 | >1 | <1 |

Legend:
F = fish
D = daphniae
A = algae

What is claimed is:

1. A nonionic detergent mixture comprising
a) an ether corresponding to formula (I):

$$R^1O(CH_2CH_2O)_mR^2 \quad (I)$$

in which $R^1$ is an aliphatic linear alkyl or alkenyl radical containing 12 to 18 carbon atoms. $R^2$ is an alkyl radical containing 1 to 4 carbon atoms or a benzyl radical and m is a number of 5 to 15, and b);

b1) an ether corresponding to formula (II):

$$R^3O(CH_2CHO)_p(CH_2CH_2O)_qR^4 \quad (II)$$
$$\phantom{R^3O(}|\phantom{CH_2CHO)_p(CH_2CH_2O)_qR^4}$$
$$\phantom{R^3O(}CH_3$$

in which $R^3$ is an aliphatic, linear or branched alkyl radical containing 8 to 10 carbon atoms, $R^4$ is an alkyl radical containing 1 to 4 carbon atoms or a benzyl radical, p is a number of 2 to 3 and q Is a number of 8 to 15 and b2) an ether corresponding to formula (III):

$$R^5O(CH_2CHO)_x(CH_2CH_2O)_yR^6 \quad (III)$$
$$\phantom{R^5O(}|\phantom{CH_2CHO)_x(CH_2CH_2O)_yR^6}$$
$$\phantom{R^5O(}CH_3$$

in which $R^5$ is an aliphatic, linear alkyl radical containing 12 to 14 carbon atoms, $R^6$ is an alkyl radical containing 1 to 4 carbon atoms or a benzyl radical, x is a number of 0.5 to 2 and y is a number of 5 to 10, wherein component b1) and component b2) are present in a ratio by weight of 25:75 to 75:25.

2. A nonionic detergent mixture as in claim 1 wherein component a) and component b) are present in a ratio by weight of 25:75 to 75:25.

3. A nonionic detergent mixture as in claim 1 further containing an ether corresponding to formula (IV):

$$R^7O(CH_2CH_2O)_nR^8 \quad (IV)$$

in which $R^7$ is an aliphatic branched alkyl radical containing 8 to 18 carbon atoms, $R^8$ is an alkyl radical containing 1 to 4 carbon atoms or a benzyl radical and n is a number of 5 to 15.

4. A nonionic detergent mixture as in claim 1 further containing a fatty alcohol polyglycol ether corresponding to formula (V):

$$R^9O(CH_2CH_2)_zH \quad (V)$$

in which $R^9$ is an alkyl radical containing 12 to 14 carbon atoms and z is a number of 2 to 4.

5. A nonionic detergent mixture as in claim 1 wherein component a) comprises a $C_{12}$–$C_{18}$ cocofatty alcohol n-butyl ether containing 10 moles of ethylene oxide.

6. A nonionic detergent mixture as in claim 1 wherein component b1) is selected from the group consisting of a $C_8$–$C_{10}$ alkyl radical n-butyl ether containing 1.3 moles of propylene oxide and 9 moles of ethylene oxide; a $C_8$–$C_{10}$ alkyl radical 2-ethylhexyl n-butyl ether containing 1.5 moles of propylene oxide and 10 moles of ethylene oxide; and a $C_8$–$C_{10}$ alkyl radical Isodecyl tertiary butyl ether containing 1.3 moles of propylene oxide and 8 moles of ethylene oxide.

7. A nonionic detergent mixture as in claim 1 wherein component b2) comprises a $C_{12}$–$C_{14}$ alkyl radical n-butyl ether containing 1.3 moles of propylene oxide and 9 moles of ethylene oxide.

* * * * *